(12) United States Patent
Takamori et al.

(10) Patent No.: US 8,322,554 B2
(45) Date of Patent: Dec. 4, 2012

(54) OPEN/CLOSE DEVICE FOR PIT COVER

(75) Inventors: Hajime Takamori, Kumagaya (JP); Takashi Negishi, Maebashi (JP)

(73) Assignee: Meidensha Corporation, Tokyo (JP)

( * ) Notice: Subject to any disclaimer, the term of this patent is extended or adjusted under 35 U.S.C. 154(b) by 312 days.

(21) Appl. No.: 12/743,488

(22) PCT Filed: Oct. 23, 2008

(86) PCT No.: PCT/JP2008/069203
§ 371 (c)(1),
(2), (4) Date: May 18, 2010

(87) PCT Pub. No.: WO2009/066536
PCT Pub. Date: May 28, 2009

(65) Prior Publication Data
US 2010/0251617 A1 Oct. 7, 2010

(30) Foreign Application Priority Data
Nov. 20, 2007 (JP) ................................. 2007-300217

(51) Int. Cl.
*B65D 43/14* (2006.01)
(52) U.S. Cl. ............... 220/252; 220/213; 49/122; 49/41
(58) Field of Classification Search .................... 49/104, 49/107, 109, 116, 122, 41, 366, 367; 220/213, 220/252, 255; 73/862
See application file for complete search history.

(56) References Cited

U.S. PATENT DOCUMENTS

| | | | | |
|---|---|---|---|---|
| 966,601 | A | * | 8/1910 | Rosenfelt et al. ............. 110/177 |
| 2,457,625 | A | * | 12/1948 | Amiot ......................... 244/129.5 |
| 3,422,573 | A | * | 1/1969 | Rich ................................. 49/340 |
| 3,623,627 | A | * | 11/1971 | Bolton ........................... 220/252 |
| 5,522,257 | A | | 6/1996 | D'Angelo et al. |
| 2010/0102061 | A1 | * | 4/2010 | Hamaguchi .................. 220/255 |

FOREIGN PATENT DOCUMENTS

| | | | |
|---|---|---|---|
| JP | 64-007290 Y2 | | 2/1989 |
| JP | 06201525 A | * | 7/1994 |
| JP | 2000-356572 A | | 12/2000 |
| JP | 2002-116118 A | | 4/2002 |
| JP | 3737910 B2 | | 11/2005 |
| WO | WO 9412751 A1 | * | 6/1994 |

* cited by examiner

*Primary Examiner* — Jerry Redman
(74) *Attorney, Agent, or Firm* — Foley & Lardner LLP

(57) ABSTRACT

A pit cover open/close device including a closing limiting stopper for a pit cover which is disposed in a position corresponding to a top of a roller of a chassis dynamometer, guides disposed on a stationary side of the pit in an opposed relation to both side faces of the roller of the chassis dynamometer and extending along a circumferential direction of the roller of the chassis dynamometer, a two-part split pit cover supported by the guides and including two pit cover parts into which the pit cover is split from a portion thereof corresponding to the position of the stopper, the two pit cover parts being movable in an opening direction and a closing direction, respectively, and a cylinder including a movable rod that is connected to one of the two pit cover parts and a body that is connected to the other of the two pit cover parts, the cylinder being driven to allow the two pit cover parts to move along the guides in the opening direction and the closing direction.

10 Claims, 5 Drawing Sheets

SIDE VIEW OF DEVICE OF
EMBODIMENT OF INVENTION

FRONT VIEW OF DEVICE OF EMBODIMENT OF INVENTION

TOP VIEW OF DEVICE OF
EMBODIMENT OF INVENTION

UNDERSIDE VIEW OF DEVICE OF
EMBODIMENT OF INVENTION

ANOTHER EMBODIMENT OF INVENTION

HOLDER PORTION IN MOUNTED STATE

OPEN/CLOSE DEVICE FOR PIT COVER

TECHNICAL FIELD

The present invention relates to a pit cover open/close device for a chassis dynamometer.

BACKGROUND ART

Generally, a chassis dynamometer is accommodated in a pit. However, only rollers of the chassis dynamometer which are used for setting wheels of an automobile thereon are arranged to be partially exposed to an outside beyond a floor surface through an upper aperture of the pit. The upper aperture of the pit is normally covered with a pit cover for safety. Conventionally, a folding-type pit cover open/close device as disclosed in Patent Literature 1 and a sliding-type pit cover open/close device as disclosed in Patent Literature 2 are known.

Patent Literature 1: Japanese Patent Application Unexamined Publication No. 2002-116118

Patent Literature 2: Japanese Patent No. 3737910

SUMMARY OF THE INVENTION

The folding-type pit cover open/close device as disclosed in Patent Literature 1 includes a movable pit cover formed by a plurality of pit cover units which are continuously connected with each other. The pit cover is operated to move along guide rails and come into an open state and a closed state. When the pit cover opened is stored within the pit, the pit cover units are folded in order and held within the pit in the folded state. In this device, the guide rails are disposed within the pit such that the pit cover is movable to the open state and the closed state along the guide rails. One end of the pit cover which is provided on a side opposed to the pit must be suspended in a vertical direction or must be folded for storing the pit cover within the pit, which requires a space for accommodation of the pit cover and, therefore, leads to reduction of a narrow space in the pit.

The sliding-type pit cover open/close device as disclosed in Patent Literature 2 is constructed such that a movable pit cover is accommodated in a horizontal attitude on an underside of a stationary pit cover by guiding it along rails during testing the automobile, and the movable pit cover is moved along the rails to cover an aperture of the pit when the test is terminated. In the device of Patent Literature 2, the respective rails must have a total length which is twice a length of the aperture of the pit, i.e., each rail must extend over the aperture of the pit and further extend by the same length as the length of the aperture of the pit over an underside of a stationary floor of the pit. Therefore, the rails have an increased size. As shown in FIG. 7 of Patent Literature 2, the pit cover is used as both a cover and a centering device and constructed to have separate parts which moved to cover a roller of the chassis dynamometer from both front and rear sides of the roller. However, in this case, since the pit cover serves as the centering device, centering rollers for centering a wheel of the automobile are projected above a floor of the pit through the aperture of the pit even when the pit cover is in the closed position. This results in disturbing the test working and causing a problem concerning safety. In addition, the carry-in and carry-out work of an automobile to be tested becomes difficult due to slippage on the centering rollers.

An object of the present invention is to provide a pit cover open/close device which requires substantially no installation space for a pit cover within a pit.

In one aspect of the present invention, there is provided a pit cover open/close device for covering and uncovering a pit aperture formed on an upper surface of a pit corresponding to an installation position of a roller of a chassis dynamometer which is disposed in the pit, the pit cover open/close device comprising: guides disposed on a stationary side of the pit in an opposed relation to both side faces of the roller of the chassis dynamometer and extending along a circumferential direction of the roller of the chassis dynamometer; a two-part split pit cover supported by the guides, the two-part split pit cover including two pit cover parts into which the pit cover is split from a portion thereof corresponding to a substantially central position of the pit aperture in a forward and rearward direction thereof, the two pit cover parts being movable in an opening direction and a closing direction, respectively; and a cylinder mounted to the two pit cover parts on a side opposite to the pit aperture, the cylinder including a movable rod that is connected to one of the two pit cover parts and a body that is connected to the other of the two pit cover parts, the cylinder being driven to allow the two pit cover parts to move along the guides in the opening direction and the closing direction, wherein the two pit cover parts are moved in the closing direction until the two pit cover parts reach the substantially central position in the forward and rearward direction of the pit aperture upon covering the pit aperture, and the two pit cover parts are moved in the opening direction upon uncovering the pit aperture.

In another aspect of the present invention, there is provided the pit cover open/close device further comprising a closing limiting stopper which is disposed on the stationary side of the pit corresponding to a top of the roller of the chassis dynamometer to limit movement of each of the two pit cover parts in the closing direction, and opening limiting stoppers which are disposed on the stationary side of the pit to limit movement of each of the two pit cover parts in the opening direction.

In a further aspect of the present invention, there is provided the pit cover open/close device wherein one of the guides is an LM guide bracket, the two pit cover parts are formed into a generally U shape and have opposed end portions, respectively, one of the opposed end portions has a wheel that is rotationally movable on the other of the guides, and the other of the opposed end portions has a plurality of LM guide blocks which are connected with the LM guide bracket.

In a still further aspect of the present invention, there is provided the pit cover open/close device further comprising reinforcement portions integrally formed with the pit cover parts, respectively, and a holder portion disposed on the stationary side of the pit, the holder portion being engaged with the reinforcement portions and supports the pit cover parts when the pit cover is in a closed state.

In a still further aspect of the present invention, there is provided the pit cover open/close device wherein the reinforcement portions are formed with holes, and the holder portion is formed with projections which are disposed in an opposed relation to the holes in the closed state of the pit cover and controlled so as to extend into the holes and retract from the holes.

The pit cover parts may have surfaces which are configured to have substantially a same curvature as a curvature of a circumference of the roller of the chassis dynamometer, respectively.

The cylinder may be an air cylinder.

Two pit cover parts may be opposed to each other so as to sandwich the closing limiting stopper therebetween when the pit cover is in a closed state.

The device may include a tape switch for detecting a closed state of the pit cover in which the two pit cover parts are opposed to each other so as to sandwich the closing limiting stopper therebetween.

The cylinder may be pivotally connected to the other of the opposed end portions of the respective pit cover parts.

DETAILED DESCRIPTION OF THE INVENTION

Figure 1:
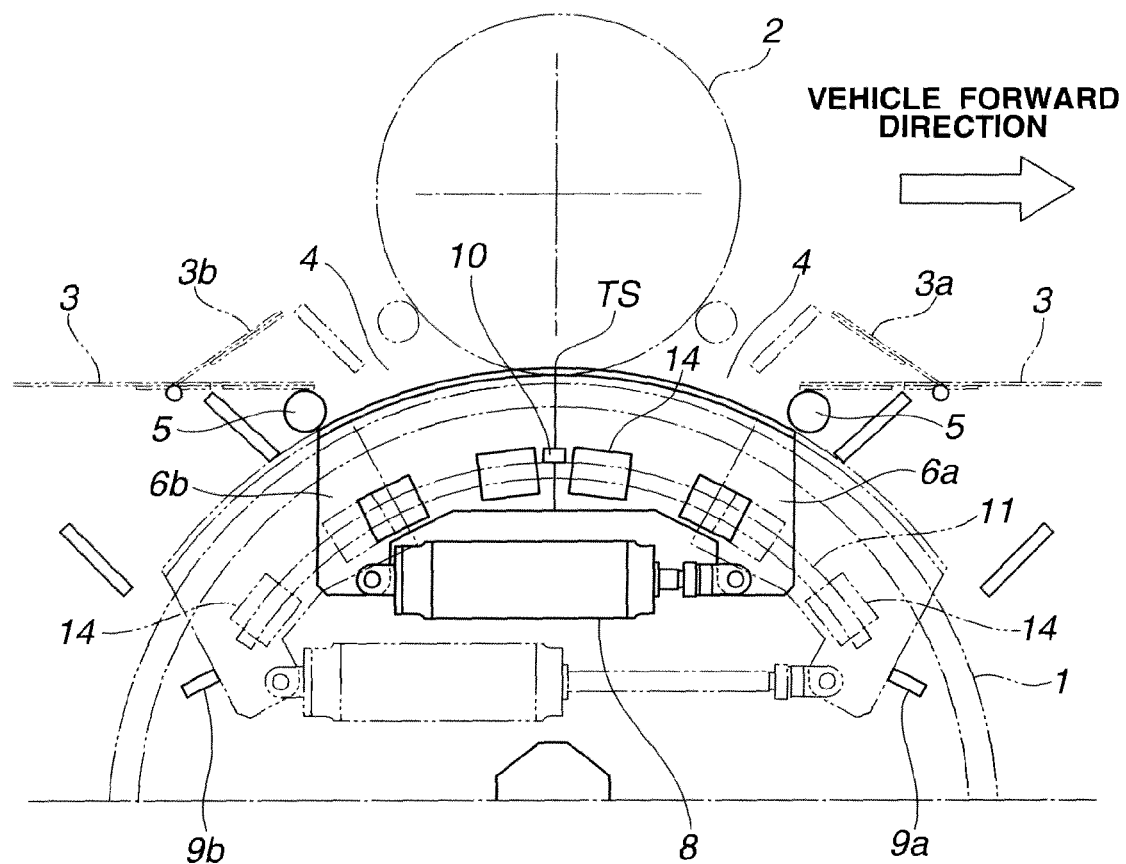
FIG. 1 is a partial side view of a pit cover open/close device according to one embodiment of the present invention.

FIGS. 1-4 are partial views of a pit cover open/close device according to a first embodiment of the present invention. In FIGS. 1-4, reference numeral 1 denotes a roller of a chassis dynamometer which is partially formed with a hollowed portion. Reference numeral 2 denotes a wheel of a vehicle to be tested which is placed on a top or vertex of the roller 1. Reference numeral 3 denotes a floor. Reference numeral 4 denotes a pit aperture defined by portions of the floors 3 as viewed on the left and right sides of FIG. 1 such that the top of the roller 1 is located in the pit aperture 4. Reference numeral 5 denotes centering rollers which are operated to adjust a position of the wheel of the vehicle to be tested such that the wheel is set in a central position in the pit aperture. Slope members 3a, 3b are pivotally mounted to opposed ends of the left and right floors which are located on a side of the pit aperture, through pivots, respectively. The slope members 3a and 3b pivotally move to form slopes, respectively, as the centering rollers 5 are upwardly moved upon setting the vehicle to be tested.

Figure 2:
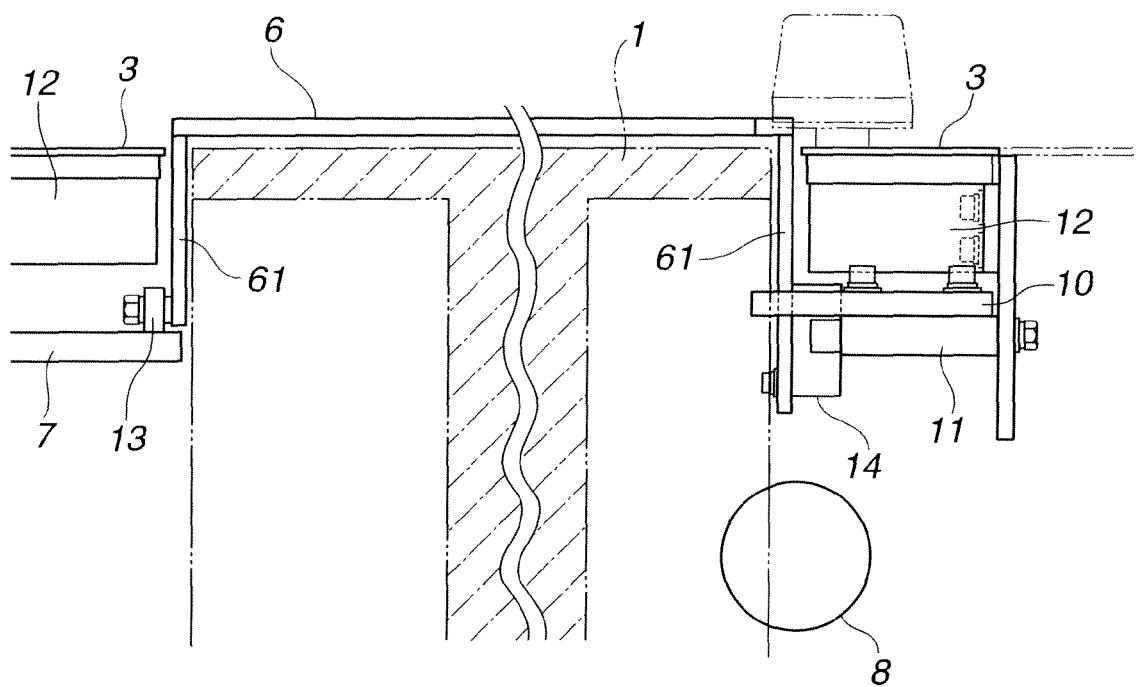
FIG. 2 is a partial front view of the pit cover open/close device according to the embodiment of the present invention.

Reference numeral 6 denotes a pit cover which is provided per one pit aperture 4 and constituted of two pit cover parts 6a, 6b. Each of the two pit cover parts 6a, 6b has two leg portions 61 on the left and right sides thereof, respectively, and is formed into a generally U shape as shown in FIG. 2. A wheel 13 is mounted to one of the leg portions which is opposed to the other of the leg portions to which a cylinder is mounted as explained later. The wheel 13 is rotationally movable on a guide 7. A plurality of LM guide blocks 14 are fixedly disposed on a side of the other of the leg portions. The LM guide blocks 14 are connected with an LM guide bracket 11 and movable along the LM guide bracket 11. Each of the pit cover parts 6a, 6b has a surface portion (i.e., the surface portion serving as a cover for a circumferential surface of the roller of the chassis dynamometer). The surface portion is configured to have substantially the same curvature as a curvature of a circumference of the roller 1. Thus, the pit cover 6 is disposed above the roller of the chassis dynamometer within the pit in a split state in which the pit cover 6 is split into the two pit cover parts 6a, 6b from a portion thereof corresponding to a substantially central position of the pit aperture 4 in a forward and rearward direction thereof, that is, in a forward and rearward direction of the vehicle to be tested, in a closed state of the pit cover 6. The two pit cover parts 6a, 6b are movable in an opening direction and a closing direction, respectively. For the sake of movement of the pit cover parts, the guide 7 and the LM guide bracket 11 are fixedly disposed on corresponding brackets 12 on a stationary side of the pit in an opposed relation to an upper portion of the left side face of the roller 1 and an upper portion of the right side face of the roller 1 and extend along a circumferential direction of the roller 1.

Figure 3:
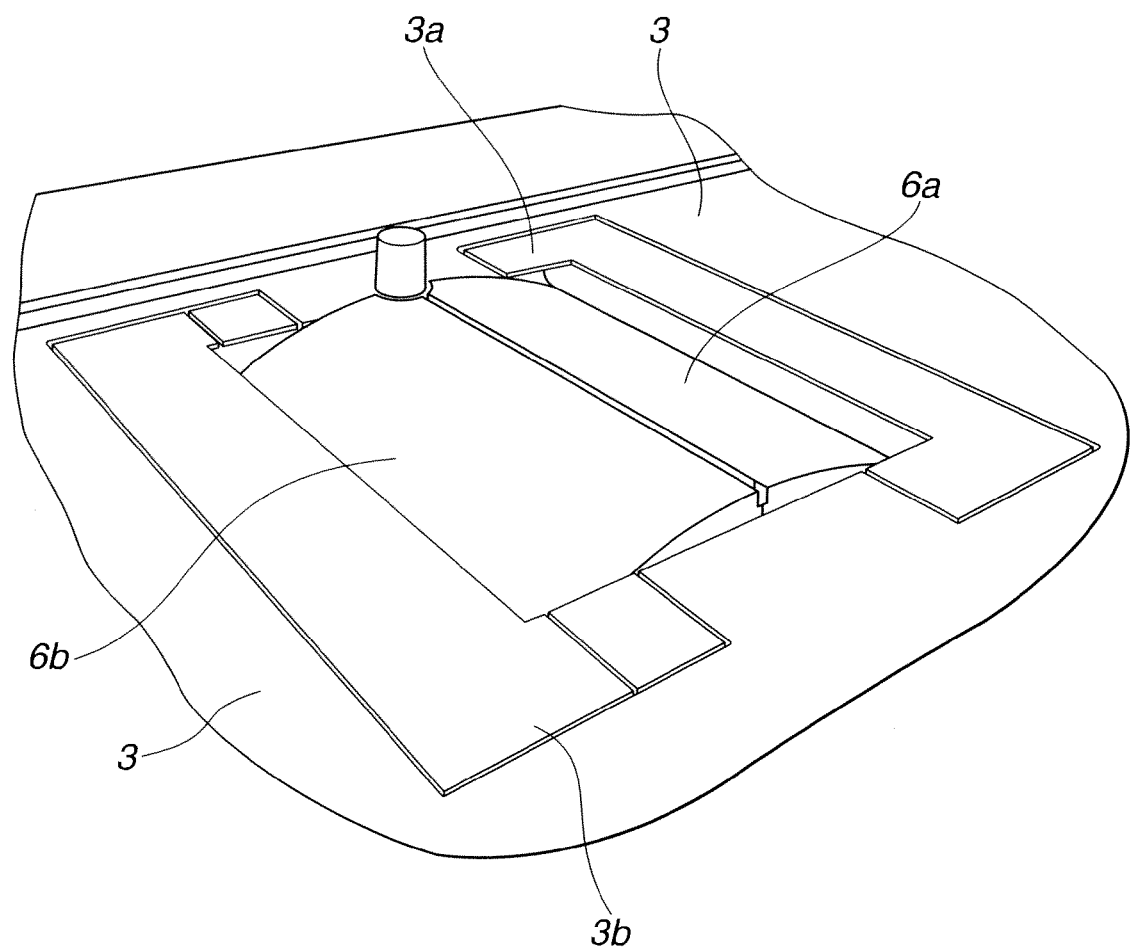
FIG. 3 is a perspective view of a top of the pit cover open/close device, in which a pit cover is in a closed state.
Figure 4:
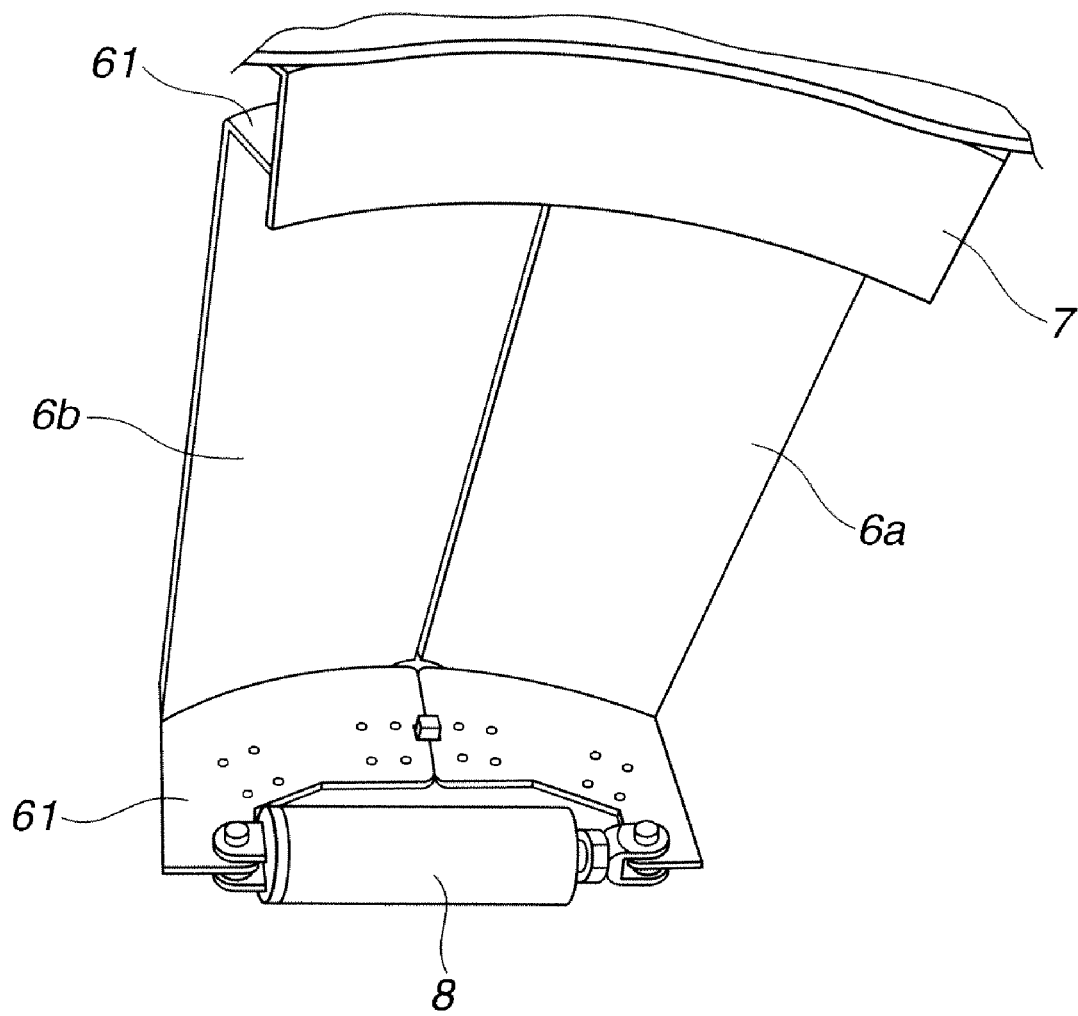
FIG. 4 is a perspective view of an underside of the pit cover open/close device, in which the pit cover is in the closed state before setting a roller.

FIG. 3 is a perspective top view of the pit cover open/close device of the first embodiment and shows that the roller of the chassis dynamometer is covered with the pit cover parts 6a, 6b. FIG. 4 is a view of the pit cover open/close device of the first embodiment when viewed from an inside of the pit under a condition that the roller of the chassis dynamometer is not installed in the pit. In this embodiment, an air cylinder is used as the cylinder 8. The cylinder 8 includes a movable rod which is pivotally connected with one of the pit cover part 6a so as to be rotationally movable relative to the one of the pit cover part 6a. The cylinder 8 further includes a body which is pivotally connected with the other of the pit cover part 6b so as to be rotationally movable relative to the other of the pit cover part 6b. As shown in FIG. 2, the cylinder 8 is partially located in the hollowed portion of the roller 1 when the cylinder 8 is connected to the two pit cover parts 6a, 6b. Reference numerals 9a, 9b denote opening limiting stoppers which are disposed on the stationary side of the pit to limit movements of the pit cover parts 6a, 6b in the opening directions of the respective pit cover parts. Reference numeral 10 denotes a closing limiting stopper which is disposed on the stationary side of the pit corresponding to a top of the roller 1 of the chassis dynamometer to limit movements of the pit cover parts 6a, 6b in the closing directions of the respective pit cover parts.

An operation of the pit cover open/close device according to the first embodiment of the present invention is explained. Normally, the cylinder 8 is placed in the position indicated by solid line in which the pit cover parts 6a, 6b are in the closed state, respectively. When the pit cover parts 6a, 6b are moved to the opened state prior to setting the vehicle to be tested on the roller 1, a pit cover opening command is outputted to the cylinder 8 and the cylinder 8 is driven such that the movable rod moves in an extension direction thereof. As the movable rod extends, the pit cover part 6a connected to the movable rod is moved along the guide 7 and the LM guide bracket 11 through the leg portions 61 in the opening direction until the pit cover part 6a reaches the position of the stopper 9a. When one end of the pit cover part 6a is contacted with the stopper 9a to limit the movement of the pit cover part 6a, the body of the cylinder 8 is started to move such that the pit cover part 6b connected to the body of the cylinder 8 is allowed to move along the guide 7 and the LM guide bracket 11 in the opening direction until the pit cover part 6b reaches the position of the stopper 9b. When it is detected that the one end of the pit cover part 6b is contacted with the stopper 9b, the movement of the body of the cylinder 8 is stopped. Thus, the pit cover 6 is placed in the opened state, and the opening operation of the pit cover 6 is terminated.

Next, in the closing operation of the pit cover 6, a pit cover closing command is outputted to the cylinder 8 and the cylinder 8 is driven such that the movable rod moves in a compression direction thereof. With the movement of the movable rod in the compression direction, the pit cover part 6a is first moved along the guide 7 and the LM guide bracket 11 in the closing direction until the pit cover part 6a reaches the position of the stopper 10. When the pit cover part 6a is contacted with the stopper 10, the movement of the pit cover part 6a is limited by the stopper 10. At this time, the body of the cylinder 8 is started to move such that the pit cover part 6b is allowed to move along the guide 7 and the LM guide bracket 11 in the closing direction until the pit cover part 6b reaches the position of the stopper 10. When the pit cover part 6b is contacted with the stopper 10, the movement of the pit cover part 6b in the closing direction is limited by the stopper 10. Thus, the pit cover 6 is placed in the closed state, and the closing operation of the pit cover 6 is terminated.

The pit cover open/close device that is arranged in one pit is explained in the above-described embodiment. However, in a case where the vehicle to be tested is a four-wheel vehicle, the same pit cover open/close device as described above may be arranged in each of four pits corresponding to the four wheels to perform the same opening and closing operations of the pit cover as described above.

Figure 5:
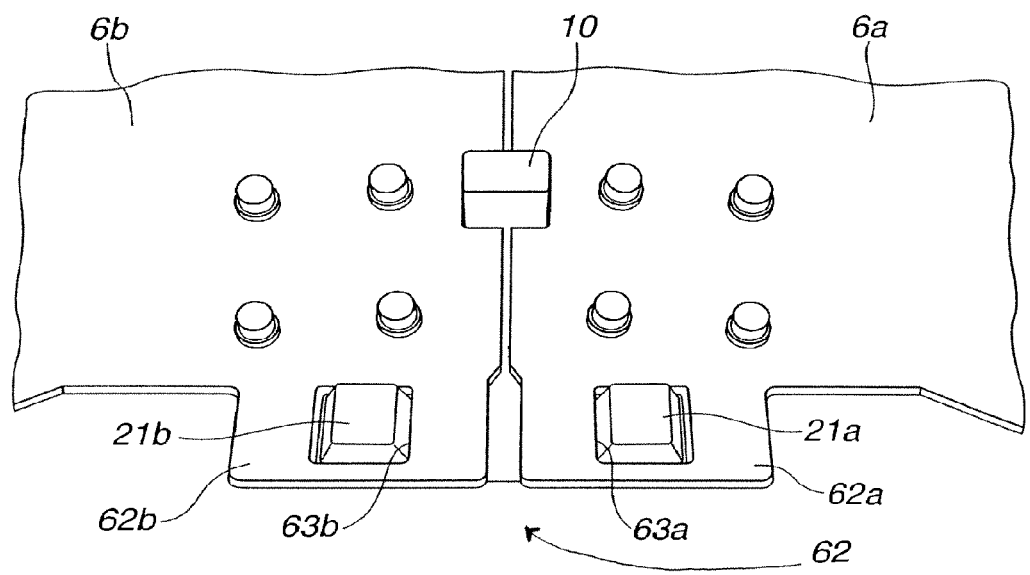
FIG. 5 is a partial view of the pit cover open/close device according to another embodiment of the present invention.
Figure 6:
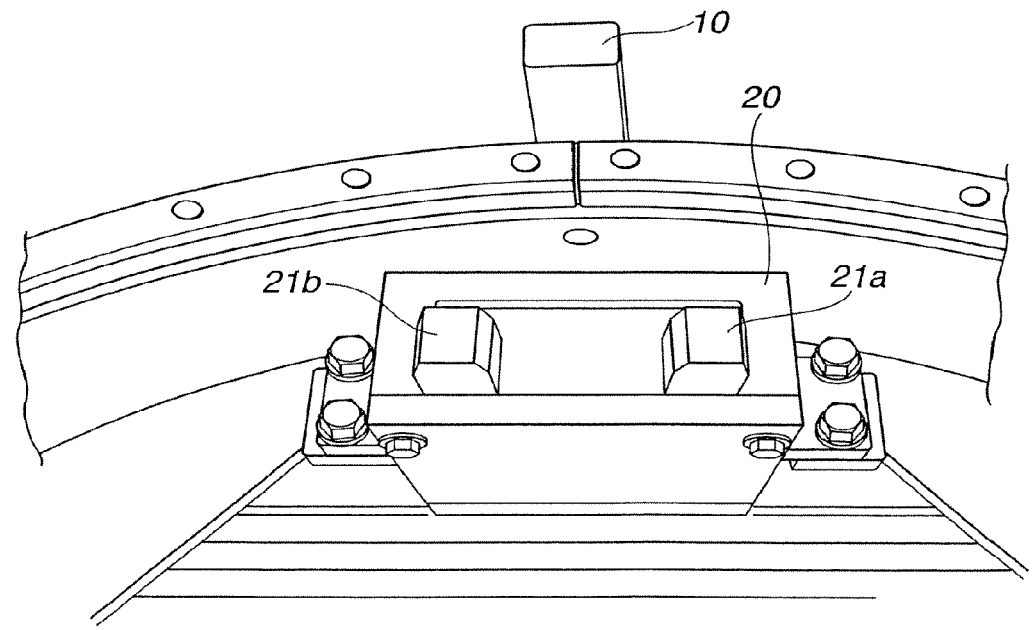
FIG. 6 is a perspective view of a holder portion of the pit cover open/close device of the another embodiment.

FIG. 5 and FIG. 6 show a second embodiment of the present invention. The vehicle to be tested is carried in the pit from the left side to the right side of FIG. 1 as indicated by arrow in FIG. 1. After that, the centering device is driven to upwardly move the centering rollers 5 and setting of the vehicle to be tested is carried out by the centering rollers 5. In a case where the vehicle to be tested is a smaller sized vehicle, there will occur no problem upon setting. However, in a case where the vehicle to be tested is a larger sized vehicle applying a large load to the pit cover which exceeds a performance of the cylinder 8 for driving the pit cover, and the larger sized vehicle is set on the pit cover, there will occur a possibility that the normal function of the pit cover is not maintained. The second embodiment has been made in view of the above problematic circumstance.

As shown in FIG. 5, reinforcement portions 62 (62a, 62b) are disposed at tip end portions of the pit cover parts 6a, 6b and integrally formed therewith, respectively. The reinforcement portions 62a, 62b have engagement holes 63a, 63b, respectively. FIG. 6 is a perspective view of a holder portion 20 in a mounted state thereof. The holder portion 20 is fixedly mounted to a position lower than the closing limiting stopper 10 that is disposed on the stationary side of the pit. The holder portion 20 includes two projections 21a, 21b which are disposed to be opposed to the holes 63a, 63b, respectively, when the pit cover parts 6a, 6b are in the closed state. The projections 21 are controlled in an extension direction in which the projections 21 extend beyond a side wall of the holder portion 20 and in a retract direction in which the projections 21 retract into the side wall, by a drive device (not shown, an air cylinder in this embodiment).

In the pit cover open/close device with the above construction, the closing movements of the pit cover parts 6a, 6b are carried out with the above-described operation of the cylinder 8, so that the pit cover parts 6a, 6b are brought into the closed state in which the two pit cover parts 6a, 6b are opposed to each other so as to sandwich the closing limiting stopper 10 therebetween as shown in FIG. 5. This closed state is detected by means of a tape switch TS (see FIG. 1) or using a stroke of the cylinder 8, etc., so that a signal indicative of termination of the closing operation of the pit cover is outputted to the drive device for the holder portion 20. The drive device drives the projections 21a, 21b in the extension direction depending on the signal inputted to the drive device. The projections 21a, 21b are driven such that tip ends thereof are projected from the holes 63a, 63b of the reinforcement portions, respectively, as shown in FIG. 5. As a result, the pit cover parts 6a, 6b are supported by the tip ends of the projections 21a, 21b, respectively.

With the above-described arrangement in this embodiment, even when the vehicle to be tested is set on the pit cover to thereby apply a load to the pit cover from an upper side of the pit cover, the pit cover can be supported by the projections 21a, 21b to thereby suppress deterioration in function of the pit cover. Further, when the pit cover parts are respectively brought into the open state, the projections 21a, 21b are controlled by the drive device so as to move in the retract direction prior to driving the cylinder 8, and then the cylinder 8 is driven after the engagement between the projections 21a, 21b and the holes 63a, 63b is released.

As understood from the above explanation, the pit cover which covers a pit aperture of a pit for a chassis dynamometer can be reduced in size. Further, the pit cover is driven to move into the open state and the closed state only by one cylinder per one pit aperture, and the cylinder is partially disposed in the hollowed portion of the roller of the chassis dynamometer. With this construction of the pit cover open/close device, an installation space for the pit cover open/close device within the pit can be substantially omitted, and therefore, the size of the pit can be reduced. Further, since the pit cover open/close device is provided with the reinforcement member against the load which is applied to the pit cover, the pit cover can be sufficiently withstand the load which is applied to the pit cover by a larger sized vehicle to be tested upon setting on the pit cover.

What is claimed is:

1. A pit cover open/close device for covering and uncovering a pit aperture formed on an upper surface of a pit corresponding to an installation position of a roller of a chassis dynamometer which is disposed in the pit, the pit cover open/close device comprising:

guides disposed on a stationary side of the pit in an opposed relation to both side faces of the roller of the chassis dynamometer and extending along a circumferential direction of the roller of the chassis dynamometer;

a two-part split pit cover supported by the guides, the two-part split pit cover including two pit cover parts into which the pit cover is split from a portion thereof corresponding to a substantially central position of the pit aperture in a forward and rearward direction thereof, the two pit cover parts being movable in an opening direction and a closing direction, respectively; and a cylinder mounted to the two pit cover parts on a side opposite to the pit aperture, the cylinder including a movable rod that is connected to one of the two pit cover parts and a body that is connected to the other of the two pit cover parts, the cylinder being driven to allow the two pit cover parts to move along the guides in the opening direction and the closing direction, wherein the two pit cover parts are moved in the closing direction until the two pit cover parts reach the substantially central position of the pit aperture in the forward and rearward direction thereof upon covering the pit aperture, and the two pit cover parts are moved in the opening direction upon uncovering the pit aperture.

2. The pit cover open/close device as claimed in claim 1, further comprising a closing limiting stopper which is disposed on the stationary side of the pit corresponding to a top of the roller of the chassis dynamometer to limit movement of each of the two pit cover parts in the closing direction, and opening limiting stoppers which are disposed on the stationary side of the pit to limit movement of each of the two pit cover parts in the opening direction.

3. The pit cover open/close device as claimed in claim 2, wherein the two pit cover parts are opposed to each other so as to sandwich the closing limiting stopper therebetween when the pit cover is in a closed state.

4. The pit cover open/close device as claimed in claim 2, further comprising a tape switch for detecting a closed state of the pit cover in which the two pit cover parts are opposed to each other so as to sandwich the closing limiting stopper therebetween.

5. The pit cover open/close device as claimed in claim 1, wherein one of the guides is a linear motion guide bracket, the two pit cover parts are formed into a generally U shape and have opposed end portions, respectively, one of the opposed end portions has a wheel that is rotationally movable on the other of the guides, and the other of the opposed end portions has a plurality of linear motion guide blocks which are connected with the linear motion guide bracket.

6. The pit cover open/close device as claimed in claim 5, wherein the cylinder is pivotally connected to the other of the opposed end portions of the respective pit cover parts.

7. The pit cover open/close device as claimed in claim 1, further comprising reinforcement portions integrally formed with the pit cover parts, respectively, and a holder portion disposed on the stationary side of the pit, the holder portion being engaged with the reinforcement portions and supports the pit cover parts when the pit cover is in a closed state.

8. The pit cover open/close device as claimed in claim 7, wherein the reinforcement portions are formed with holes, and the holder portion is formed with projections which are disposed in an opposed relation to the holes in the closed state of the pit cover and controlled so as to extend into the holes and retract from the holes.

9. The pit cover open/close device as claimed in claim 1, wherein the pit cover parts have surfaces which are configured to have substantially a same curvature as a curvature of a circumference of the roller of the chassis dynamometer, respectively.

10. The pit cover open/close device as claimed in claim 1, wherein the cylinder is an air cylinder.

* * * * *